United States Patent
Jaeger et al.

(10) Patent No.: US 6,319,436 B1
(45) Date of Patent: *Nov. 20, 2001

(54) METHOD FOR MAKING FLOOR FAN SEAL PLUG WITH THERMOEXPANDING SEAL RING AND AXIAL GUIDE MEMBERS

(75) Inventors: Wilfred R. Jaeger, Rochester Hills; Gary G. Gordon, Southfield, both of MI (US)

(73) Assignee: TRW Inc., Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,150

(22) Filed: Oct. 27, 1997

(51) Int. Cl.$^7$ .................................................. B29C 44/06
(52) U.S. Cl. ....................... 264/40.6; 264/46.4; 264/46.6; 264/255; 264/268
(58) Field of Search .............................. 215/355; 138/89; 296/208; 220/323, 326, 795, 796, 799–805, 787, 789, DIG. 19; 264/46.4, 46.6, 255, 268, 40.6

(56) References Cited

U.S. PATENT DOCUMENTS

| | | | |
|---|---|---|---|
| 975,926 | * 11/1910 | Bazeley | ................................ 220/800 |
| 3,991,446 | * 11/1976 | Mooney et al. | .................... 138/89 X |
| 4,091,962 | 5/1978 | van Buren, Jr. . | |
| 4,263,237 | * 4/1981 | Weeden et al. | ....................... 264/263 |
| 4,346,812 | * 8/1982 | Banich, Sr. | ........................... 215/352 |
| 4,363,420 | * 12/1982 | Andrews | ............................. 220/787 |
| 4,588,104 | 5/1986 | Danico . | |
| 4,588,105 | 5/1986 | Schmitz et al. . | |
| 4,761,319 | * 8/1988 | Kraus et al. | ...................... 220/787 X |
| 4,787,795 | 11/1988 | Kraus . | |
| 4,885,121 | * 12/1989 | Patel | .................................. 264/255 |
| 4,960,628 | * 10/1990 | Stumphauzer et al. | ................. 428/81 |
| 4,988,467 | * 1/1991 | Holdsworth et al. | ................. 264/255 |
| 5,001,865 | * 3/1991 | Procton | .................................. 49/469 |

(List continued on next page.)

FOREIGN PATENT DOCUMENTS

| | | | |
|---|---|---|---|
| 726626 | * 10/1942 | (DE) | ..................................... 138/89 |
| 1573251 | * 7/1969 | (FR) . | |
| 2 731 984 A1 | 3/1995 | (FR) . | |
| 8300500 | * 3/1984 | (NL) | ..................................... 138/89 |

OTHER PUBLICATIONS

European Search Report dated Nov. 30, 1999.

Primary Examiner—Allan R. Kuhns
(74) Attorney, Agent, or Firm—Fay, Sharpe, Fagan, Minnich & McKee, LLP

(57) ABSTRACT

A seal plug (10) for closing a aperture in a panel includes a cover cap (12), a set of seal plug retaining tabs (32, 34, 36, 38) extending from a bottom face (16) of the plug and a set of guide elements (60, 62, 64, 66) extending from the bottom face of the plug. The guide elements (60–66) disposed on the bottom face of the seal plug define a first axially orientated lead-in surface. The retaining tabs (32–38) disposed on the bottom face of the seal plug define a second axially orientated lead-in surface. The first and second lead-in surfaces cooperate making the seal plug easy to install. A thermoexpanding plastic sealing ring (30) adapted to soften and expand upon heating to a temperature of about 250° F. is disposed on the bottom face of the seal plug. The seal ring expands and softens in an oven enabling the seal plug to become firmly bonded to a surface defining an aperture. A preferred method of manufacturing the seal plug includes closely controlling the temperature of the die members (102, 104) in a two-shot injection molding apparatus (100) within a range of 135° F.–180° F. in order to inject the seal ring material in a flowable state. The first step in the two-shot molding process injects nylon into a first cavity forming the cover cap. The second step injects the heat responsive thermoexpanding material into a second cavity forming the sealing ring on the cover cap.

14 Claims, 5 Drawing Sheets

U.S. PATENT DOCUMENTS

| | | | |
|---|---|---|---|
| 5,188,787 | * | 2/1993 | King et al. .............................. 264/255 |
| 5,259,526 | * | 11/1993 | Stolzman .............................. 220/802 |
| 5,353,472 | * | 10/1994 | Benda et al. ............. 220/DIG. 19 X |
| 5,448,809 | | 9/1995 | Kraus . |
| 5,513,820 | * | 5/1996 | Meyer .............................. 220/801 X |
| 5,536,756 | * | 7/1996 | Kida et al. . |
| 5,658,509 | * | 8/1997 | Sawyer et al. ....................... 264/46.4 |
| 5,662,231 | * | 9/1997 | Adams et al. ........................ 215/254 |
| 5,697,825 | * | 12/1997 | Dynka et al. . |
| 5,712,317 | * | 1/1998 | Makhlouf et al. . |
| 5,852,854 | | 12/1998 | Pierrot et al. . |
| 5,861,214 | * | 1/1999 | Kitano et al. . |

* cited by examiner

METHOD FOR MAKING FLOOR FAN SEAL PLUG WITH THERMOEXPANDING SEAL RING AND AXIAL GUIDE MEMBERS

BACKGROUND OF THE INVENTION

This invention pertains to the art of closure devices and methods for making closure devices and, more particularly, to such devices and their manufacture used in covering and sealing openings or apertures formed in thin plates, rigid sheets of metal, or other materials.

The invention is particularly applicable to the type of closure plugs used for covering openings in motor vehicle body panels and will be described with particular reference thereto. It is to be appreciated, however, that the invention has broader applications and may advantageously be employed for other uses in a variety of different environments whenever it is necessary to cover and seal an opening in a support panel.

In the manufacture of motor vehicles, closure devices are used to permanently close various body panel apertures or access openings which have served their intended purpose and are no longer required, or to perform some other useful function such as to reduce the effective diameter of an opening to a desired new size or to provide a suitable mounting surface for another component. Such openings may be required initially for many reasons, e.g., as paint discharge openings or access openings to accommodate mounting of vehicle components. It is typically required that these discharge or access apertures be tightly covered and sealed after they have served their useful function in order to prevent moisture, road dirt, noise, exhaust fumes, and the like from entering into the motor vehicle through the panel aperture.

Conventional closure devices that provide a fluid-tight seal have heretofore included a main body portion attached to a separate sealing ring made from a material different than that comprising the body of the closure device. The main body portion of the conventional closure devices are typically formed of a durable metal material or a resilient synthetic or plastic material to ensure the mechanical integrity of the closure device. The sealing rings, however, are often formed from soft materials such as extruded rubberized compounds or heat sealable materials. During the manufacture of such conventional closure devices, much time and effort is consumed in first extruding and die cutting the sealing rings and then in mounting the separate sealing rings onto the body of the closure devices such as by a mechanical connection, or by using adhesives or the like. Often, the sealing rings are attached to the plug bodies by hand. Such arrangement and practice is disadvantageous because of the additional cost and labor investment required.

Two-shot molding techniques have been used in the past to mold various components from two different materials. As an example, two-shot molding can be used to form parts having two different colors or to form parts having two different hardness regions. However, two-shot molding techniques have heretofore been unsuccessful in producing parts formed of a rigid plastic together with a thermoexpandable material due mainly to an inability to control the temperature of the molding dies.

It has, therefore, been considered desirable to develop a new and improved closure device and assembly and method for making same which overcomes the foregoing deficiencies and others while providing better and more effective operation of results.

BRIEF SUMMARY OF THE INVENTION

According to the subject invention, a closure assembly is provided for use in covering and sealing an aperture formed in a support panel. The assembly includes a thin cover cap having a flat top and an underside provided with a plurality of axially extending, circumferentially spaced apart, resilient guide elements and a corresponding plurality of axially extending circumferentially spaced apart retaining legs. The guide elements and retaining legs cooperate to form a locating shoulder on the underside so that the closure assembly can be snap-locked into position in an opening. The closure assembly is provided with a heat responsive thermoexpandable annular plastic ring that is carried on a corresponding circular wall formed on the underside of the cover cap. When the closure assembly is in place in an aperture and subjected to heat in the range of 85° C. to 180° C., the thermoexpandable annular plastic ring undergoes a transformation whereat the ring expands to occupy a space of about 1.5 times its original size. The expanding annular plastic ring flows in all directions between the underside of the cover cap and the vehicle body panel to form a fluid-type seal between the plug and the panel.

According to another aspect of the invention, a closure assembly having the above described construction is manufactured using a two-shot injection molding process. During the first shot, the cover cap is formed together with the guide elements and retaining legs by injecting a resilient nylon material into the mold cavity. During a second period, the mold cavity is cooled and adapted to receive the secondary material forming the annular seal ring. During a third period, the secondary thermoexpandable material is injected into the mold to form the annular seal ring on the cover cap. The unitary closure assembly is ejected from the injection molding machine after the third period.

The principal advantage of the present invention is in the improved method for assembling a unitary closure assembly formed of dissimilar compounds.

Another advantage of the present invention is in the improved method of operating a two-shot injection molding machine for constructing a unitary closure assembly formed of dissimilar compounds.

Still another advantage of the present invention is in an improved beryllium copper molding die for use in a two-shot injection molding machine to construct a unitary closure assembly formed of dissimilar compounds.

Yet another advantage of the present invention is the provision of an improved closure assembly for covering and sealing an aperture in a panel manufactured through the two-shot molding process of the type generally above.

Another advantage of the invention resides in the provision of such an assembly which can serve as a protective guard and securely close a panel aperture.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, and in certain steps and arrangements of steps, the preferred embodiments of which will be described in detail in this specification and illustrated in the accompanying drawings which form a part hereof, and wherein.

DETAILED DESCRIPTION OF THE PREFERRED EMBODIMENTS

Figure 1:
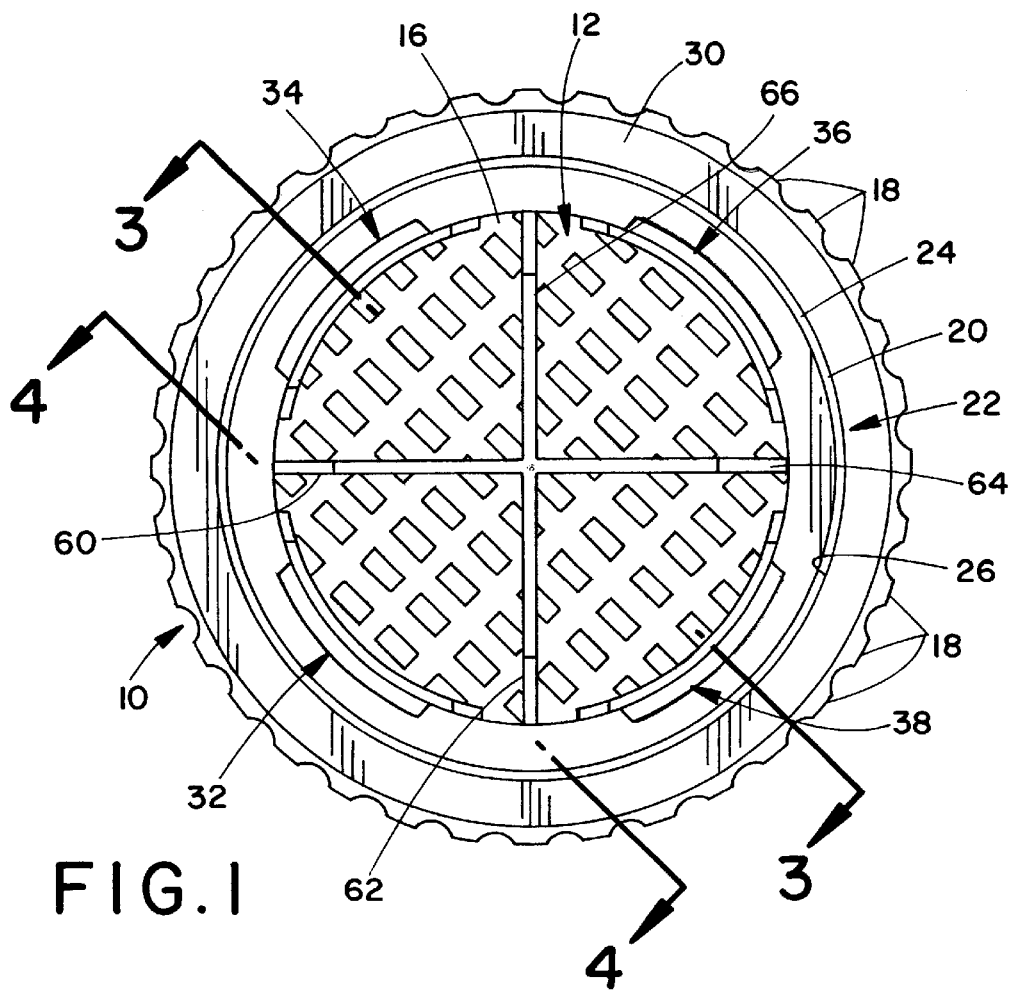
FIG. 1 is a bottom plan view of a closure assembly formed in accordance with the subject invention.

Referring now to the drawings wherein the showings are for the purposes of illustrating the preferred embodiments of the invention only and not for purposes of limiting same, FIGS. 1–5 show the subject new seal plug 10 which is adapted to be securely affixed to an automotive body panel in sealing relation to an aperture formed in the panel. Although the preferred embodiment illustrated is most useful in connection with automotive body panels, it should be appreciated that the invention finds application anywhere components such as hooks, latches, plates or the like are secured to a surface or to other parts in an oven or using any other heat process.

Figure 5:
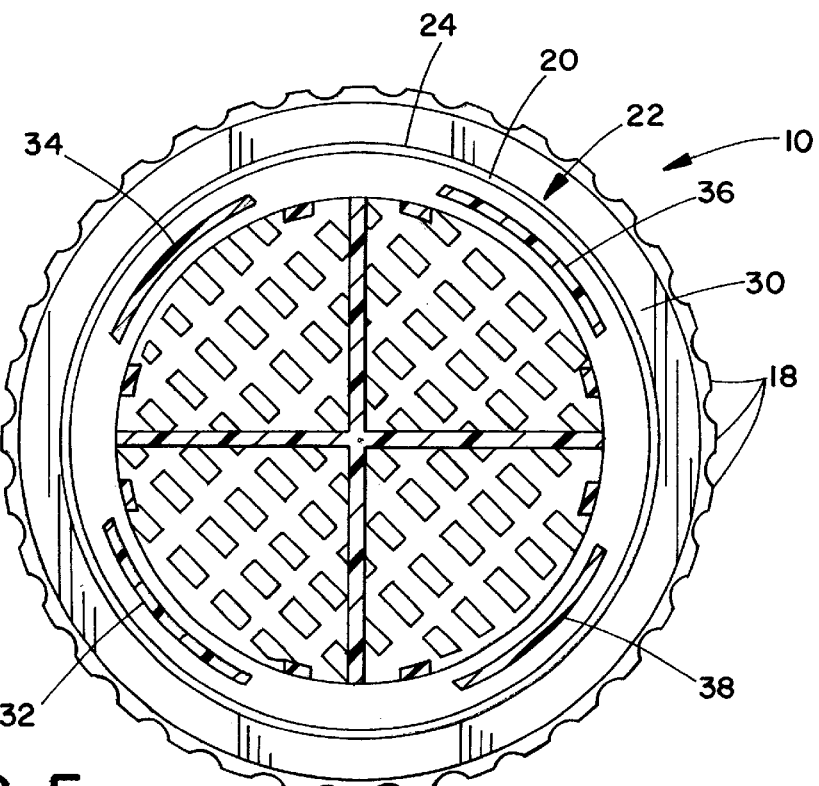
FIG. 5 is a cross-sectional view of the closure assembly taken along line 5—5 of FIG. 2.

The seal plug is comprised of a thin cover cap 12 formed preferably of nylon or any other moldable rigid synthetic or plastic material. The cover cap defines a first or outer surface 14 and a second or inner surface 16, the first and second surfaces being arranged in opposed relation to each other. A set of reinforcement ribs are disposed on the inner surface 16 as shown. As best shown in FIGS. 1 and 5, the cover cap 12 has a generally circular peripheral conformation, although it will be understood that other conformations may also be used satisfactorily to accommodate a particular application or need. In that regard, according to the preferred embodiment, the cover cap 12 includes a plurality of spaced-apart protuberances 18 disposed about the outer periphery of the cover cap. As illustrated, the protuberances 18 are formed between semi-circular indents arranged on the cover cap. The protuberances 18 are shaped and provided as shown to make the seal plug easier to handle during insertion into various apertures.

A carrier wall 20 or shoulder is integrally formed along the outer periphery 22 of the cover cap to depend from the second surface 16 along a continuous circular pattern. The carrier wall 20 defines an outer cylindrical surface 24 adapted to frictionally engage a correspondingly sized inner cylindrical surface 26 formed on a heat responsive annular plastic ring 30. The heat responsive plastic ring 30 is made of an injection moldable elastomeric-based heat expandable material. Although many foamable or heat expandable thermoplastic material can be injection molded into a ring shape or extruded and later die cut into rings, the inventors have found that L-2300 and L-4161 plastics from L&L Products, Inc. and RV-7125-3 plastic from Ruvin, Inc. are particularly well suited for two-shot injection molding according to the novel manufacturing method steps of the present invention.

Figure 2:
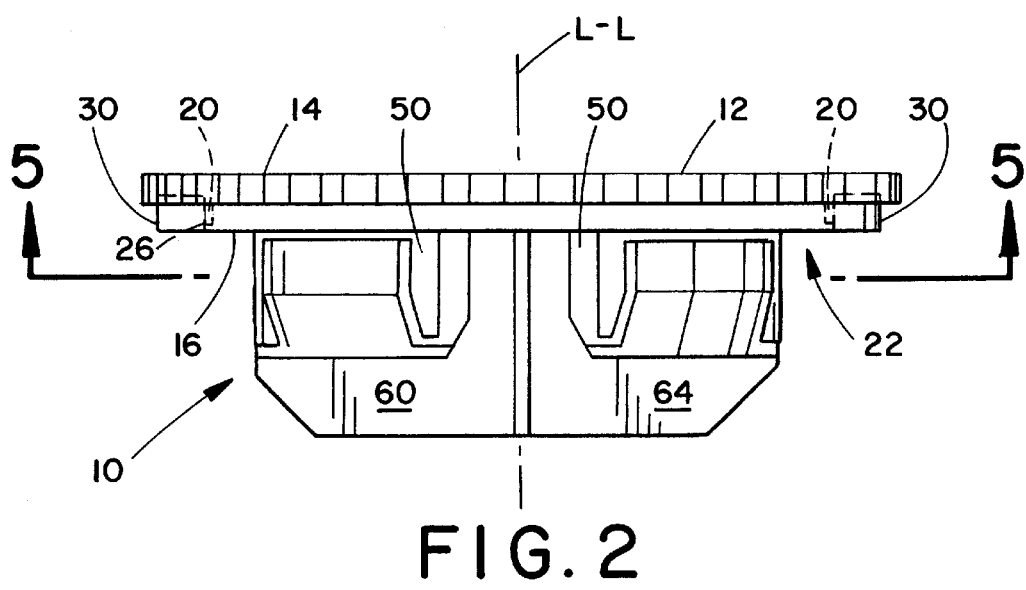
FIG. 2 is a side elevational view of the closure assembly shown in FIG. 1.
Figure 3:
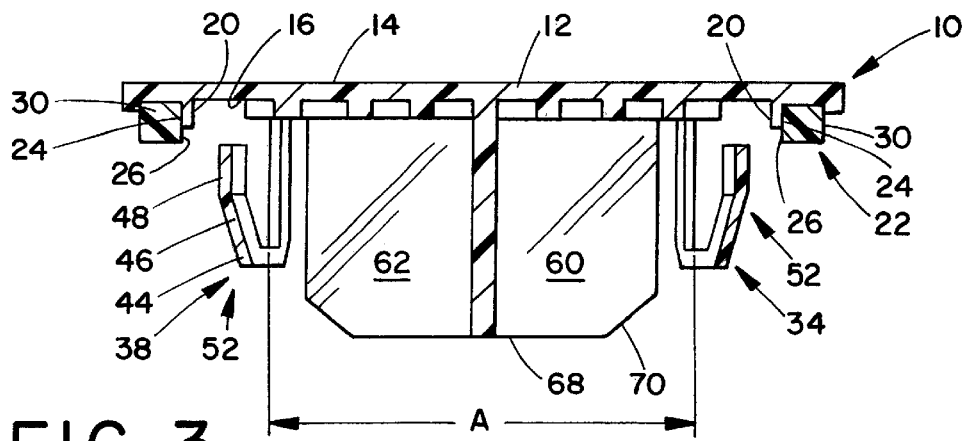
FIG. 3 is a cross-sectional view of the closure assembly taken along line 3—3 of FIG. 1.
Figure 4:
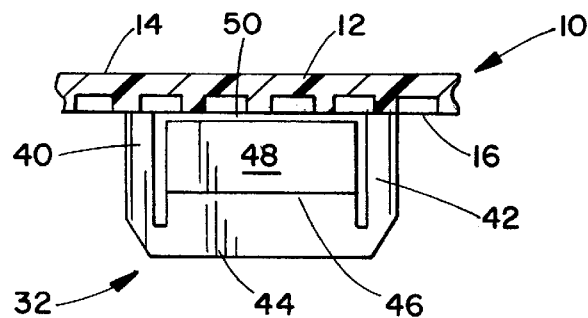
FIG. 4 is a cross-sectional view of the closure assembly taken along line 4—4 of FIG. 1.

Continuing with reference to FIGS. 1–5, four retaining tabs 32, 34, 36, 38 are provided on the inner surface 16 of the cover cap 12. As shown, the retaining tabs are preferably uniformly circumferentially spaced about the periphery 22 of the seal plug. The retaining tabs are constructed in an identical manner in the preferred embodiment, so that the following description of retaining tab 32 is equally applicable to the remaining tabs unless otherwise specifically noted. As best shown in FIGS. 3 and 4, retaining tab 32 is comprised of two small bars or resilient struts 40, 42 axially extending from the inner surface 16 of the cover cap 12. A rest element 44 is arranged between the resilient strut members 40, 42 in a manner as illustrated. The rest element 44 forms a hook with a connection area 46 oriented at a predetermined angle in relationship to the resilient strut members 40, 42. A stop area 48 is disposed on the rest element 44 at a predetermined distance from the inner surface 16 of the cover cap 12.

According to the present invention, the rest element 44 is adapted to penetrate through and engage the edges of an aperture. It is apparent from FIG. 2 that the stop area 48 arranged on the resilient strut members 40, 42 is surrounded by a continuous open area or traversing channel 50. According to this arrangement, the stop area 48 can penetrate or deflect radially inward by resilient compression up to a plane defined by the resilient strut members 40, 42 and beyond. In that manner, the plurality of retaining tabs 32-38 can be collapsed radially down to a diameter of A in order to fit into an aperture having a diameter of A.

With continued reference to FIGS. 1–5, but with particular reference to FIG. 2, the stop area 48 extends from the connection area 46 for a predetermined distance parallel to the adjacent resilient strut members 40, 42. The connection area 46 of the retaining tab 32 is arranged at an acute angle, preferably between 30–35 degrees, relative to the longitudinal axis L—L of the seal plug defining a chamfer 52. The set of chamfers defined on each of the retaining tabs 32–38 collectively define a frusto conical surface oriented axially along the longitudinal axis L—L of the seal plug. The frusto conical surface thereby defined provides a first lead-in structure making the seal plug easy to install, particularly blind installations such as are common on automotive body assembly lines.

With still yet continued reference to FIGS. 1–5, four guide elements or pilot members 60, 62, 64, 66 are provided on the second surface 16 of the cover cap 12. The guide elements 60–66 axially extend from the second surface 16 and are uniformly circumferentially spaced about the periphery 22 of the cover cap 12. The guide elements 60–66 divide the inner surface 16 of the cover cap into four equal parts. Each of the guide elements 60–66 are constructed in an identical manner, so that the following description of guide element 60 is equally applicable to the remaining guide element unless otherwise specifically noted. Guide element 60 extends axially beyond the retaining tabs 32–38 by a predetermined amount as best illustrated in FIGS. 2 and 3. The guide element 60 is substantially planar in configuration and includes a flat nose edge 68 and an angled guide edge 70. The set of guide edges 70 disposed on the set of guide elements 60–66 collectively define a frusto conical surface oriented axially along the longitudinal axis L—L of the seal plug, providing a secondary lead-in surface. The secondary lead-in surface extends axially beyond the terminus of the first lead-in surface defined by the retaining tabs as shown, making the seal plug extremely easy to install.

As shown in the Figures, the frusto conical surface defined by the guide elements 60–66 cooperates with the frusto conical surface defined by the retaining tabs 32–38 to provide cooperative first and second lead-in surfaces on the cover cap. Although the preferred embodiment illustrates the respective frusto conical surfaces as being axially coincident and the lead-in angle defined by the guide elements 60–66 being greater than the lead-in angle defined by the retaining tabs 32–38, other configurations are also contemplated within the scope of the present invention including the first lead-in angle matching the second lead-in angle.

The overall construction described above makes the seal plug of the present invention substantially self-aligning or self-orienting with respect to panel apertures. This makes the seal plug particularly well adapted to be inserted into an automotive body panel aperture with little or only slight operator effort or concentration. In a typical automotive assembly line, the seal plug of the present invention is used as a closure plug to seal metal floor pan drain holes in vehicle body assemblies. As would be understood by those skilled in the art, the seal plug is installed in the floor pan any time after the chassis cathodic "e-coat bake" cycle but prior to the "color bake" cycle whereat the thermoexpandable seal ring is heated and thermoexpanded, bonding the cover cap to the floor pan, thereby closing and sealing the drain hole.

As described generally above, the heat responsive seal ring 30 is preferably made of an elastomeric-based heat expandable plastic sealer material selected to simultaneously soften and easily flow when heated above a first preselected design temperature and to expand when heated above a second preselected design temperature. The seal ring according to the present invention can be made from any thermoexpandable material having these general qualities but is preferably made from a material selected from the group of materials that meet Chrysler Motor Corporation Engineering Standard No. MS-CD466C known and available to those skilled in the art. Included in that group are the L-2300, L-4161 and RV-7125-3 plastic materials identified above. These materials are soft and flowable between about 140–180 degrees Fahrenheit, thermoexpanding when above about 180 degrees Fahrenheit, and solidifying when at temperatures under 140 degrees Fahrenheit.

As the installed seal plug passes through the bake oven during assembly of an automobile chassis, the seal ring softens causing the inner surface 16 of the plug to recede towards the body panel into which the plug is engaged owing to the spring force generated in that direction by the set of retaining tabs 32–38. After the total expansion stage of the preferred seal material is reached, the material hardens and adheres to both the cover cap and the body panel in a fluid tight relationship. According to the present invention, at a temperature of about 250 degrees Fahrenheit in the chassis bake oven, the material expands to about 150% of its original unexpanded volume. Once hardened, the preferred material cannot be reactivated.

Figure 6A:
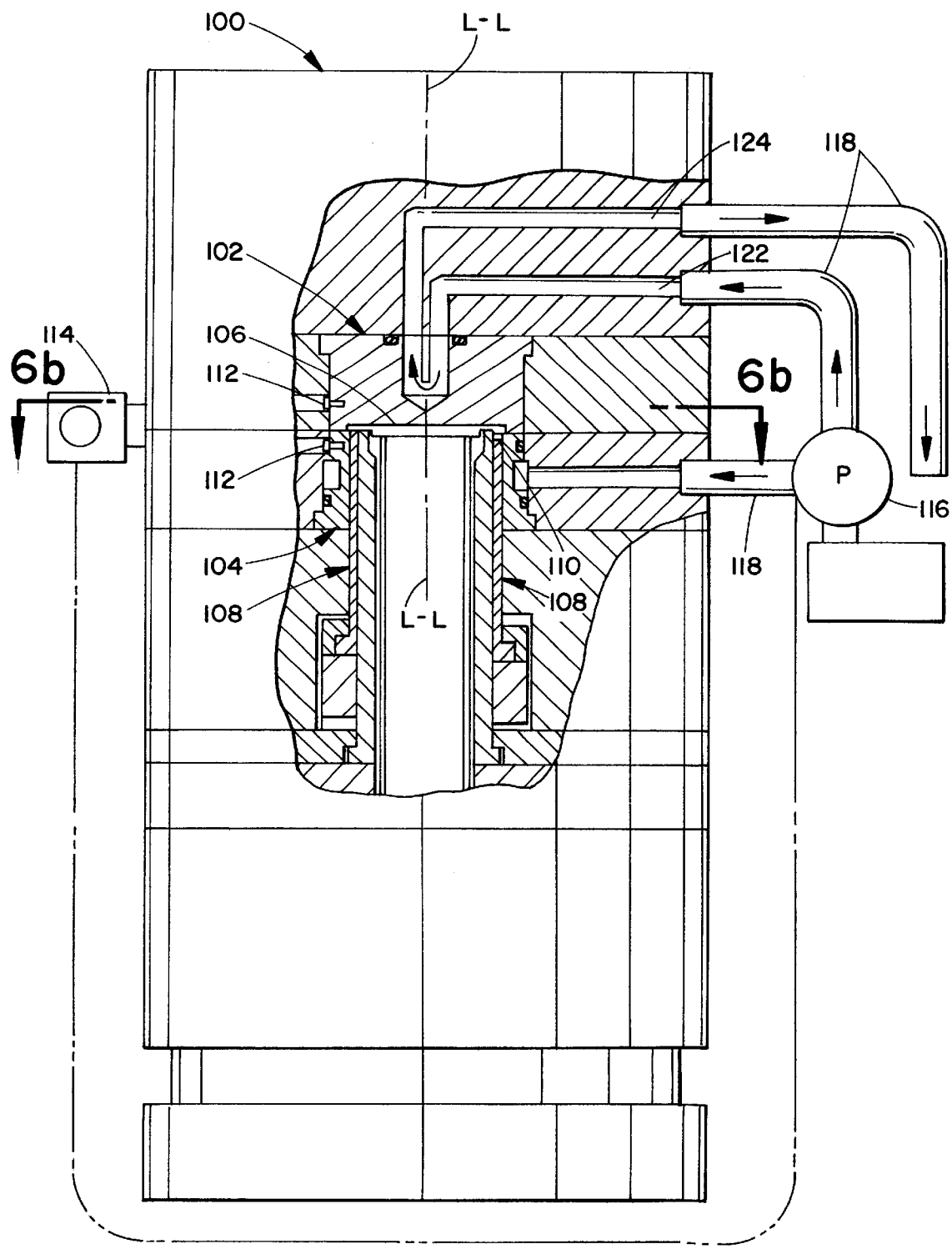
FIG. 6a is a schematic illustration of a two-shot injection molding system operated in accordance with the subject invention.
Figure 6B:
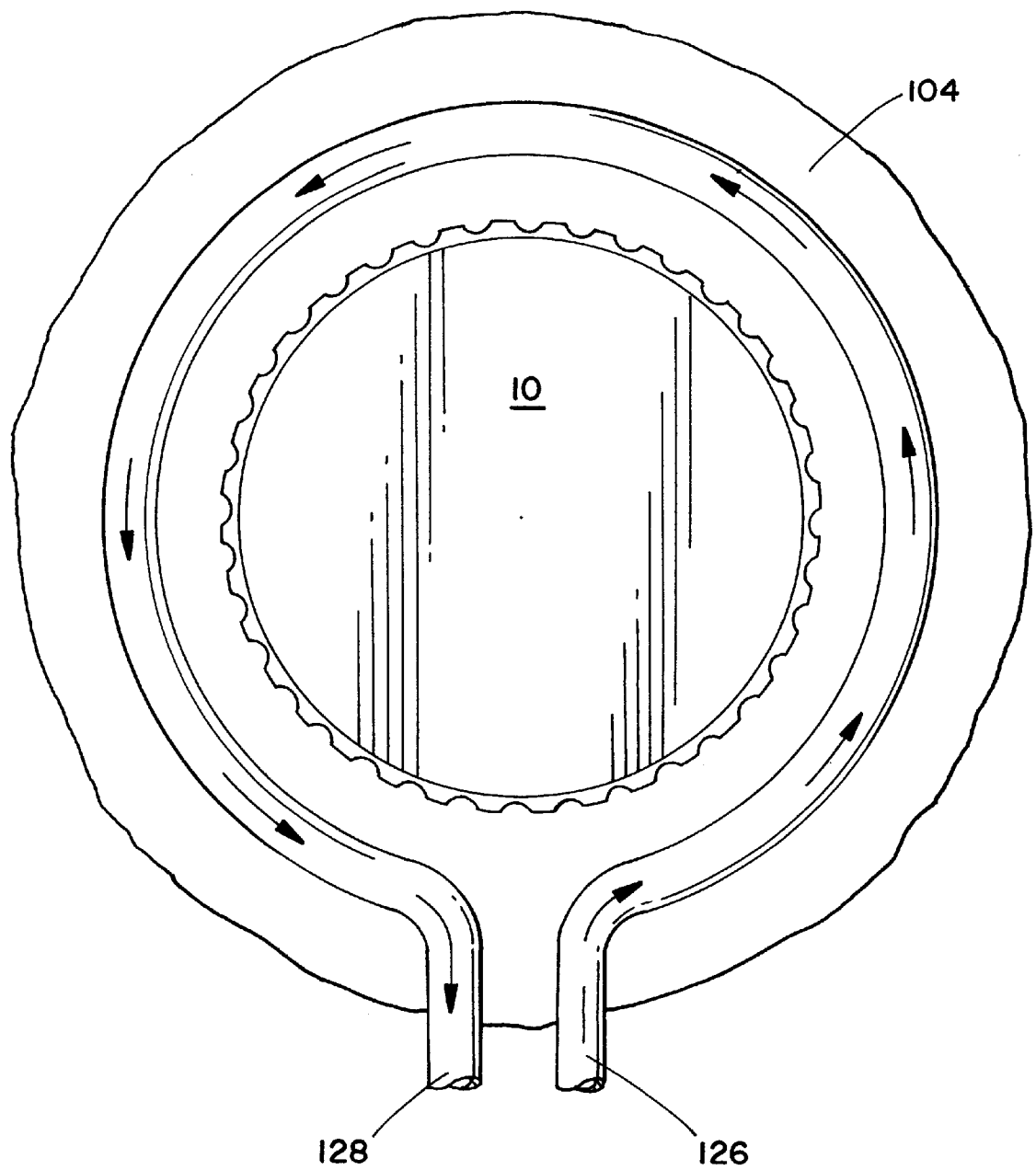
FIG. 6b is a schematic cross sectional top view illustration of the lower two-shot molding die of FIG. 6a taken along line 6b—6b; and, FIG. 7 is a timing diagram illustrating a method of manufacturing a seal plug device according to the subject invention.

With reference next to FIGS. 6a and 6b, a preferred method of manufacturing the seal plug according to the present invention will be described. A two-shot injection molding apparatus 100 is provided with first and second die members 102, 104 forming a first cavity 106 defining the cover cap formed during a first injection shot. A substantially cylindrical moveable member 108 is adapted to slide from a first position illustrated on the left of FIG. 6a to a second position illustrated on the right of FIG. 6a. When the moveable member is disposed in the position illustrated on the right of FIG. 6a, a second mold cavity 110 is thereby created substantially defining the die cavity within which the heat responsive plastic ring is formed. The first and second mold cavities are preferably contiguous as illustrated so that the heat responsive plastic ring is formed directly onto the cover cap body during the second shot. This advantage of the present invention makes manual installation of the seal ring unnecessary, saving time and labor costs.

The present invention includes a novel method of molding a unitary seal plug part from two dissimilar materials, preferably a nylon cover cap and heat expandable seal ring, by controlling the temperature of the die members 102, 104 and the timing of the injection shots. In that regard, the present invention includes first and second die members 102, 104 formed of beryllium copper. Alternatively, beryllium copper inserts or a beryllium copper coating may be used in the die members 102, 104. It has been found that beryllium copper has excellent thermal characteristics. More particularly, beryllium copper is well suited to dissipate heat quickly and has been demonstrated to be an excellent thermal conductor having good mechanical qualities complementary to use in molding dies.

In order to control the transfer of thermal energy from the injection molding apparatus to reliably inject the thermoexpandable seal ring material within its flowable temperature range of about 140–180 degrees Fahrenheit, a control system is provided including a thermal sensor pair 112, an electronic injection molding apparatus controller 114, a fluid pump 116 responsive to a signal from the controller, and a coolant conduit system 118 for circulating a coolant fluid through the first and second die members 102, 104. The fluid conduit system 118 is connected to a source of a chilled coolant fluid 120 such as water.

As best shown in FIG. 6a, the conduit system 118 extends into the top die member 102 substantially along the longitudinal axis L—L of the seal plug formed between the top and bottom die members. A top die supply conduit 122 delivers the chilled coolant fluid 120 to the center region of the top die member 102 in the manner illustrated in order to most effectively cool the top and center of the die. A top die return conduit 124 returns the coolant fluid 120 from the center region of the top die member 102 to the fluid source in the manner illustrated. Although only single supply and return conduits are illustrated, multiple conduits and multiple conduit paths can be used to cool the top die member 102 as well.

As best shown in FIG. 6b, the conduit system 118 extends into the bottom die member 104 substantially circularly around the plastic seal plug 10 formed between the top and bottom die members. A bottom die supply conduit 126 delivers the chilled coolant fluid 120 to the region of the bottom die member 104 surrounding close to the outer periphery of the seal plug in the manner illustrated in order to most effectively cool the bottom die. A bottom die return conduit 128 returns the coolant fluid 120 from the bottom die member 104 to the fluid source in the manner illustrated. As with the top die coolant fluid conduits, although only single supply and return conduits are illustrated, multiple conduits and multiple conduit paths can be used to cool the bottom die member 104 as well.

It is an advantage of the present invention that the top and bottom coolant conduits 122, 124 and 126, 128 are separated. In that way, the top and bottom coolant conduits operate somewhat independently. The heat absorbing capacity of the top coolant conduits 122, 124 does not interfere with the heat absorbing capacity of the bottom coolant conduits 126, 128. However, in certain applications, it may be possible or desirable to arrange the top and bottom coolant conduits in many configurations and topologies, such as, for example, the top and bottom coolant conduits may be connected in series.

Figure 7:
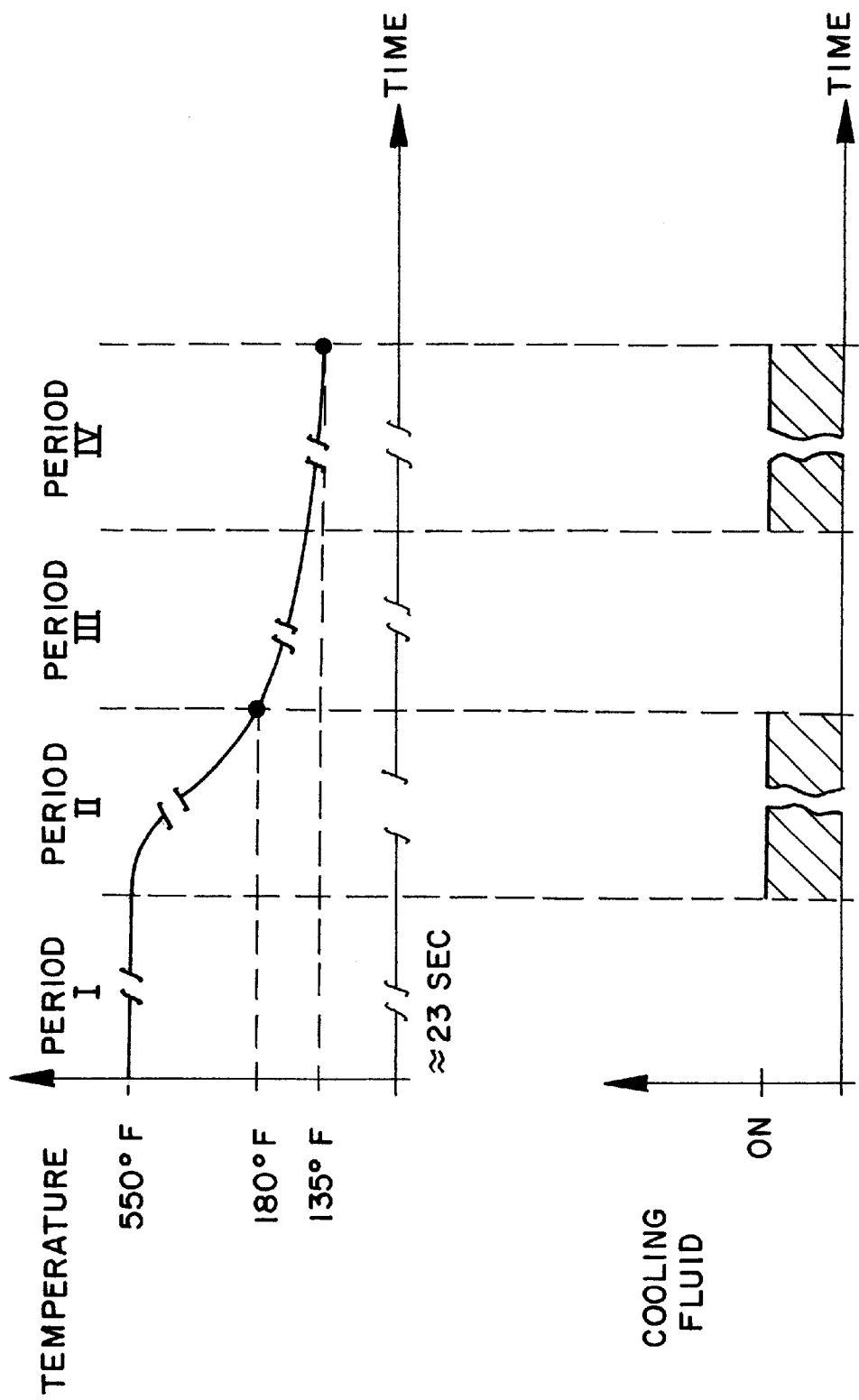

With continued reference to FIGS. 6a, 6b and also with reference to FIG. 7, the nylon material comprising the cover cap is injected into the top and bottom die members 102, 104 during a first molding period, Period I, at a temperature of about 550° F. During Period I, the fluid pump 116 is OFF as determined by the controller 114. The first period lasts for about 23 seconds. Those skilled in the art refer to this period as the "first shot."

After the nylon material is injected into the first cavity 104, the controller turns on the fluid pump 116 in order to cool the die members 102, 104. During this period, Period II, the controller is responsive to signals from the thermal sensor pair 112 in order to determine a suitable temperature for injection of the heat responsive material into the second cavity. Also during Period II, the movable member 108 is translated into the position shown on the right of FIG. 6a. This creates the second mold cavity in order to accommodate the "second shot" of heat responsive plastic material.

When the thermal sensor 112 registers a signal indicating that the die members have cooled to a temperature at which the foamable seal ring material will flow under pressure, preferably 180° F., but well below the activation temperature of about 250° F., the controller 114 interrupts the fluid pump 116 to stop flow of the coolant material. The second shot of the heat responsive plastic material takes place during this third period, Period III, illustrated in FIG. 7.

Lastly, in a fourth period, Period IV, according to the preferred method, the controller 114 reinitiates the fluid pump 116 to cool the die members 102, 104 yet further to a temperature accommodating complete solidification and ejection of the completed unitary seal plug. The controller in conjunction with the thermal sensor cooperate to stop the fluid pump and open the mold when the temperature of the die members reaches about 135° F.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A method of making a seal plug in a two-shot injection molding machine, the method comprising the steps of:

providing a molding apparatus, the molding apparatus including a molding die temperature control system and a fluid cooled beryllium copper molding die adapted to be cooled by a working fluid flowing through a closed loop path defined in the molding die;

during a first time period, forming a resilient cover cap member by injecting a thermoplastic material into a first mold cavity defined by said molding die;

using said temperature control system during a second time period, cooling said molding die from a second temperature above a first temperature range to a first temperature within said first temperature range by passing said working fluid through said closed path defined in the fluid cooled molding die; and, during a third time period, forming a seal ring on the resilient cover cap member by providing a heat responsive foamable material that is flowable when within said first temperature range and thermoexpanding when above said first temperature range, and injecting said heat responsive foamable material into a second mold cavity defined by said molding die after said molding die reaches said first predetermined temperature.

2. A method of making a seal plug in a two-shot injection molding machine, the method comprising the steps of:

providing a molding apparatus, the molding apparatus including a molding die temperature control system and a fluid cooled molding die adapted to be cooled by a working fluid flowing through a closed loop path defined in the molding die;

during a first time period, forming a resilient cover cap member by injecting a nylon thermoplastic material into a first mold cavity defined by said molding die;

using said temperature control system during a second time period, cooling said fluid cooled molding die from a second temperature of about 540 degrees Fahrenheit and above a first temperature range to a first temperature of about 180 degrees Fahrenheit within said first temperature range by passing said working fluid through said closed path defined in the fluid cooled molding die; and, during a third time period, forming a seal ring on the resilient cover cap member by providing a heat responsive foamable material that is flowable when within said first temperature range and thermoexpanding when above said first temperature range, and injecting said heat responsive foamable material into a second mold cavity defined by said molding die after said molding die reaches said first predetermined temperature.

3. A method of making a seal plug, the method comprising the steps of:

providing a beryllium copper molding die;

providing a molding die temperature control system;

during a first time period, forming a resilient cover cap member portion of the seal plug by injecting a thermoplastic material into a first mold cavity defined by said molding die;

using said temperature control system during a second time period, cooling said molding die to a first predetermined temperature; and, during a third time period, forming a seal ring portion of the seal plug on the resilient cover cap member by injecting a foamable material into a second mold cavity defined by said molding die.

4. The method of making a seal plug according to claim 3 wherein the step of injecting said foamable material into the second mold cavity includes:

providing a heat responsive foamable material, the heat responsive foamable material being flowable when within a first temperature range and being thermoexpanding when above said first temperature range; and, injecting said heat responsive foamable material into said second mold cavity after said molding die is cooled to said first predetermined temperature.

5. The method of making a seal plug according to claim 3 wherein the step of providing said molding die includes providing a fluid cooled molding die adapted to be cooled by a working fluid flowing through a closed path defined in the molding die.

6. The method of making a seal plug according to claim 5 wherein the step of cooling said molding die during said second time period includes using said temperature control system to cool said molding die from a second temperature above said first temperature range to said first temperature within said first temperature range by passing said working fluid through said closed path defined in the fluid cooled molding die.

7. The method of making a seal plug according to claim 3 wherein:

the step of providing said molding die temperature control system includes providing a conduit system extending through molding die for carrying a working fluid through the molding die member; and, the step of cooling said molding die to said first predetermined temperature includes, using said temperature control system, circulating said working fluid through said conduit system.

8. The method of making a seal plug according to claim 7 wherein the step of providing said molding die temperature control system includes providing a thermal sensor in said molding die for sensing a temperature in the molding die.

9. The method of making a seal plug according to claim 8 wherein the step of cooling said molding die to said first predetermined temperature includes:

using said thermal sensor, determining a temperature of said molding die; and, using said temperature control system, circulating said working fluid through said conduit system until the temperature of the molding die reaches said first predetermined temperature.

10. A method of making a seal plug in a two-shot injection molding machine, the method comprising the steps of:

providing a molding apparatus including a molding die and a molding die temperature control system;

during a first time period, forming a resilient cover cap member by injecting a nylon thermoplastic material into a first mold cavity defined by said molding die;

using said temperature control system during a second time period, cooling said molding die from a second temperature of about 540 degrees Fahrenheit and above a temperature range to a first predetermined temperature of about 180 degrees Fahrenheit within said temperature range; and, during a third time period, forming a seal ring on the resilient cover cap member by injecting a thermoexpandable heat responsive foamable material into a second mold cavity defined by said molding die, the foamable material being adapted to expand to about one and a half times its original size when above said first temperature range.

11. The method of making a seal plug according to claim 10 wherein the step of providing said molding die includes providing a beryllium copper molding die.

12. The method of making a seal plug according to claim 10 wherein:

the step of providing said molding die temperature control system includes providing a conduit system extending through molding die for carrying a working fluid through the molding die member; and, the step of cooling said molding die to said first predetermined temperature includes, using said temperature control system, circulating said working fluid through said conduit system.

13. The method of making a seal plug according to claim 12 wherein the step of providing said molding die temperature control system includes providing a thermal sensor in said molding die for sensing a temperature in the molding die.

14. The method of making a seal plug according to claim 13 wherein the step of cooling said molding die to said first predetermined temperature includes:

using said thermal sensor, determining a temperature of said molding die; and, using said temperature control system, circulating said working fluid through said conduit system until the temperature of the molding die reaches said first predetermined temperature.

* * * * *